(12) United States Patent
Kiessling

(10) Patent No.: US 11,353,119 B2
(45) Date of Patent: Jun. 7, 2022

(54) CLOSING DEVICE FOR A GAS-CONDUCTING CONDUIT

(71) Applicant: KÖRA-PACKMAT Maschinenbau GmbH, Villingendorf (DE)

(72) Inventor: Volkmar Kiessling, Villingendorf (DE)

(73) Assignee: KÖRA-PACKMAT Maschinenbau GmbH, Villingendorf (DE)

( * ) Notice: Subject to any disclaimer, the term of this patent is extended or adjusted under 35 U.S.C. 154(b) by 3 days.

(21) Appl. No.: 16/983,322

(22) Filed: Aug. 3, 2020

(65) Prior Publication Data

US 2021/0041029 A1 Feb. 11, 2021

(30) Foreign Application Priority Data

Aug. 5, 2019 (DE) ...................... 10 2019 121 073.9

(51) Int. Cl.
| | |
|---|---|
| *F16K 3/03* | (2006.01) |
| *F16K 3/02* | (2006.01) |
| *F16K 31/53* | (2006.01) |
| *F16K 31/54* | (2006.01) |

(52) U.S. Cl.
CPC .............. *F16K 3/03* (2013.01); *F16K 3/0254* (2013.01); *F16K 31/54* (2013.01)

(58) Field of Classification Search
CPC .......... F16K 3/03; F16K 3/0254; F16K 31/54; F16K 31/535
See application file for complete search history.

(56) References Cited

U.S. PATENT DOCUMENTS

| | | | |
|---|---|---|---|
| 2,307,273 | A | 1/1943 | Hughes |
| 6,271,486 | B1 | 8/2001 | Franklin |
| 2011/0132905 | A1 | 6/2011 | Ognjanovski et al. |

FOREIGN PATENT DOCUMENTS

| | | |
|---|---|---|
| EP | 2075889 A2 | 7/2009 |
| EP | 3477135 A1 | 5/2019 |
| EP | 3477165 A1 | 5/2019 |

(Continued)

OTHER PUBLICATIONS

European Search Report for European Application No. 20188467.3, dated Dec. 3, 2020.

(Continued)

*Primary Examiner* — Marina A Tietjen
(74) *Attorney, Agent, or Firm* — Jason H. Vick; Sheridan Ross, PC

(57) ABSTRACT

Closing device for a gas-conducting line, the closing device having a first connection side with a first opening and a second connection side with a second opening, the closing device further having a plurality of closing elements with a substantially flat extension, which are arranged in and can be pivoted in a working plane, so that the closing elements block a flow of gas in a closed position and allow a free flow of gas in a flow position, wherein each closing member has a first bounding side of its substantially flat extent and a second bounding side of its substantially flat extent, which are formed complementary to each other, so that each closing element bears positively against the adjacent closing elements in the closed position, so that the substantially flat extensions block the flow, and wherein the adjusting element can be actuated from outside the base body.

19 Claims, 3 Drawing Sheets

(56) References Cited

FOREIGN PATENT DOCUMENTS

FR 3073031 A1 * 5/2019 ........... F16K 31/001
JP S 48-002124 A 1/1973

OTHER PUBLICATIONS

Notification of Reason(s) for Refusal (Including Translation) for corresponding Japanese Patent Application No. 2020-128948, dated Jan. 6, 2022.

* cited by examiner

CLOSING DEVICE FOR A GAS-CONDUCTING CONDUIT

CROSS REFERENCE TO RELATED APPLICATION

This application claims priority from German patent application 10 2019 121 073.9, filed on Aug. 5, 2019. The entire contents of this priority application is incorporated herein by reference.

BACKGROUND

In the control and drive technology of machines, there may be a need to control a flow of gas, especially air, very quickly and with very large changes in flow rate. In particular, there may be a requirement to change the flow rate from a maximum to a minimum or from a minimum to a maximum.

Due to production speeds that are sometimes very high, it may in particular be necessary to achieve the change in flow rate within a time of 100 ms, or a maximum of 50 ms (milliseconds) and or a maximum of 30 ms, especially from a maximum flow to a minimum flow or from a minimum flow to a maximum flow.

SUMMARY

The inventor has further identified the requirement that the gas flow in the open state can pass through the closing device as unhindered as possible, in particular completely unhindered. Otherwise, turbulence will occur which will obstruct the gas flow and reduce the actual gas quantity compared to an expected gas quantity. Furthermore, vibrations or noises may occur.

In addition, the inventor noted that some applications may require the closing device to provide sufficient resistance to back pressure generated when the closing device is closed. Otherwise there is a risk that the sealing device will be damaged or will not seal sufficiently, especially at the high speed of the closing process.

As determined by the inventor, there is also a desire to keep the size of the closing device as small as possible. Thus, the closing device should have the smallest possible height or thickness along the gas flow direction. Furthermore, the expansion of the closing device perpendicular to the gas flow direction should be as small as possible in relation to the cross-section of the gas passage opening, in particular not more than three times the size of the gas passage area.

Finally, the inventor noted that it may be preferable that the closing device has a modular embodiment that can be easily retrofitted into existing systems.

As determined by the inventor, known closing devices always offer only a compromise, in which only some of the desired properties can be fulfilled only insufficiently or not at all. It is therefore one object of the present invention to show an improved closing device which fulfils the existing requirements as much as possible, in particular completely.

There is provided a closing device for a gas-conducting conduit, wherein the closing device comprises a base body extending between a first connecting side with a first opening and a second connecting side with a second opening, wherein the connecting sides each extend in a width direction and a height direction and are spaced apart from one another by a circumferential frame which forms a jacket of the base body, the closing device also having a plurality of closing elements with a substantially flat extension, which are arranged in a working plane extending in the width direction and the height direction and are arranged between the first connecting side and the second connecting side, each of the closing elements being arranged about a pivot axis which is perpendicular to the substantially flat extension, and being pivotable in the working plane so that the closing elements block a flow of gas from the first opening to the second opening in a blocking position and allow a free flow of gas from the first opening to the second opening in a flow position, wherein each closing element has a first bounding side of its substantially flat extension and a second bounding side of its substantially flat extension which are configured complementary to each other, so that each closing element in the blocking position has its first bounding side in the working plane positively locking to the second bounding side of an adjacent closing element and with its second bounding side in the working plane rests in positive locking engagement with the first bounding side of a further adjacent closing element, so that the substantially flat extensions block the flow, wherein the closing elements are in operative connection with a common actuating element, so that the closing elements are in the flow position in an open position of the actuating element and are in the blocking position in a closed position of the actuating element, and wherein the actuating element can be actuated from outside the base body.

The closing device is structurally stable and mechanically reliable. Since the closing elements move in the same working plane and each closing element is configured positive locking to the adjacent closing element, a quick change between the flow position and the blocking position is possible.

In an exemplary embodiment, the base body is cuboid.

This embodiment may enable a modular construction, by means of which the closing device can be easily integrated into existing systems. The extension of the closing device in a longitudinal direction, i.e. parallel to the gas flow direction, is considerably smaller than the extension in height direction and the extension in width direction. In some exemplary embodiments, the extension in the longitudinal direction is at least by a factor of 2, or at least by a factor of 3, or at least by a factor of 5, or at least by a factor of 7 smaller than the extension in the height direction and the extension in the width direction.

In another exemplary embodiment, the first connecting side and/or the second connecting side is rectangular, in particular square.

This embodiment may also support the modular use of the closing device.

In another exemplary embodiment, the frame extends in sections in a longitudinal direction and the width direction and in the longitudinal direction and the height direction.

With this embodiment, the frame may enclose the longitudinal direction or the gas flow direction.

In another exemplary embodiment, the first opening is round and/or the second opening is round.

This embodiment may make it possible, as will be explained in an exemplary embodiment, to design the closing device with small dimensions. In addition, there may be a simple possibility to connect the closing device to round gas-conducting conduits.

In another exemplary embodiment, the second bounding side is rounded or a radius of the second bounding side corresponds to the radius of the first opening.

This embodiment may enable particularly compact dimensions of the closing device. When opening, the closing elements may be moved so far outwards that the passage from the first opening to the second opening is unhindered. When viewed along the gas flow direction, i.e. the longitudinal direction, the second bounding side may then be in contact with the periphery of the first opening, in particular also with the periphery of the second opening. This may make particularly good use of the space formed between the gas flow and the frame. It should be noted that a radius of the first bounding side may also correspond to the radius of the first opening and in particular also to the radius of the second opening, since the first bounding side is configured complementary to the second bounding side.

In another exemplary embodiment, the first bounding side has a first beveled edge and the second bounding side has a second beveled edge which are configured complementary to one another, so that the first beveled edge and an adjacent second beveled edge at least partially overlap in the blocking position when viewed along the longitudinal direction.

This embodiment may provide a good seal and good mechanical stability in the event of dynamic pressure.

In another exemplary embodiment, the closing device has a plurality of drive output elements, wherein one drive output element of the plurality of drive output elements is arranged in a rotationally fixed manner on each closing element, which is in operative connection with the actuating element, so that when the actuating element is displaced, a torque is exerted on the drive output element, which pivots the closing element about the pivot axis.

This embodiment may offer a robust and mechanically simple possibility to pivot the closing elements from the blocking position to the flow position and vice versa.

In another exemplary embodiment, each of the drive output elements has a gear wheel which engages with a toothed rail arranged on the actuating element.

This embodiment may enable a reliable power transmission between the actuating element and the drive output element. In addition, it may be ensured in this way that no misalignment with regard to the pivot angle occurs even if the actuating element is operated frequently.

In another exemplary embodiment, the actuating element is configured as a ring with several recesses, wherein the drive output elements engage in the recesses.

This embodiment may be mechanically reliable and may require only little space.

In another exemplary embodiment, the actuating element has a lever which is guided outwards through the jacket of the base body in a slot.

This embodiment may support the modular use of the closing device. The operation of the closing elements, i.e. switching between the flow position and the blocking position and vice versa, does not require access into the closing device. It is only necessary to move the lever, which is accessible from the outside.

In another exemplary embodiment, a maximum pivot angle of the closing elements between the flow position and the blocking position is less than 90°, or less than 80°, or less than 70°, or less than 60°.

This embodiment may make it possible that the closing elements only have to be displaced by a small amount. This may help to keep the closing speed and the opening speed low.

In another exemplary embodiment, the number of closing elements is minimum 3 and maximum 6 and is especially 4.

This embodiment was found to be advantageous in tests with regard to the desired properties of the closing device and the complexity of the mechanical construction.

In another exemplary embodiment, each closing element has a third bounding side of its substantially flat extension, which lies against the frame in the flow position.

This embodiment may be advantageous because in this way a final position of the closing element's movement is defined for the flow position. It also makes good use of the available space within the closing device, allowing the closing device to be made compact overall.

It is understood that the above and the features to be explained below can be used not only in the combinations indicated, but also in other combinations or in isolation, without leaving the scope of the present invention.

BRIEF DESCRIPTION OF THE DRAWINGS

Examples of the invention are shown in the drawings and are explained in more detail in the following description. The figures show.

DETAILED DESCRIPTION

Figure 1:
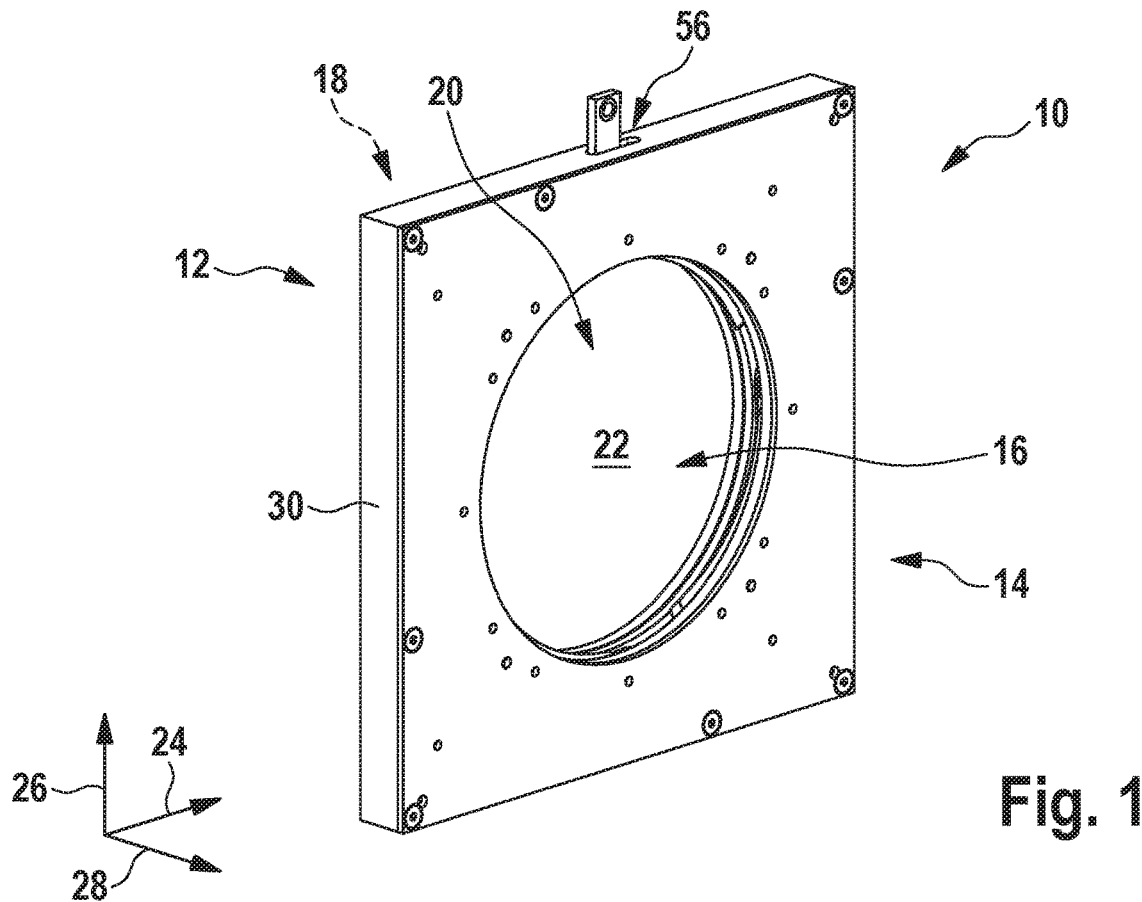
FIG. 1 a perspective view of an embodiment of a closing device for a gas-conducting conduit.

FIG. 1 shows a perspective view of a closing device 10 for a gas-conducting conduit.

The closing device 10 has a base body 12 extending between a first connecting side 14 with a first opening 16 and a second connecting side 18 (here hidden) with a second opening 20. A passage, aperture, or gas passage 22 is thus formed. This aperture may have a periphery of a particular size or diameter. The closing device 10 may correspond to a low-profile gas conduit flow closure device. In some embodiments, a thickness of the closing device 10 in the longitudinal direction 28 may be sized to be as small as possible. For instance, not including necessary assembly clearances, the thickness may be sized as the sum of the thicknesses of the components housed within base body 12. In some embodiments, the components housed at least partially within the base body 12 may engage with one another and/or be compactly arranged (e.g., such that there are few, if any, empty spaces) between the first connecting side 14 and the second connecting side 18. In one embodiment, a first duct (e.g., gas conveying conduit, etc.) may be connected to the first connecting side 14 of the closing device 10 and a second duct may be connected to the second connecting side 18 of the closing device 10. When closed, the closing device 10 may block, or even completely obstructs, gas flow through the aperture forming the gas passage 22.

The connecting sides 14, 18 each extend a width in a width direction 24 and height in a height direction 26 and are spaced apart by a circumferential frame 30, which forms a jacket of the base body 12. The extents of the height and the width may define an outer frame of the base body. In some embodiments, the jacket may be referred to herein as the outer frame. A longitudinal direction 28 is also shown. The first side and the second side may be separated by a thickness that is measured along the longitudinal direction 28. In some embodiments, the low-profile closing device 10 comprises an overall thickness of the closing device 10 (e.g., measured from an outside surface of the first connecting side 14 to an outside surface of the second connecting side 18 along the longitudinal direction 28) may be sized to be less than a fraction of the size associated with the height or width of the connecting sides 14, 18 and/or the closing device 10. For instance, the overall thickness may be sized to be ¼ the size of the height or width, ⅕ the size of the height or width, ⅙ the size of the height or width, ⅛ the size of the height or width, ¹⁄₁₀ the size of the height or width, ¹⁄₁₂ the size of the height or width, or even smaller. This relatively slim design provides a low-profile, or thin, device that is easily insertable into an existing conduit line (e.g., retrofittable, etc.) or into a position joining two adjacent conduit lines.

Figure 2:
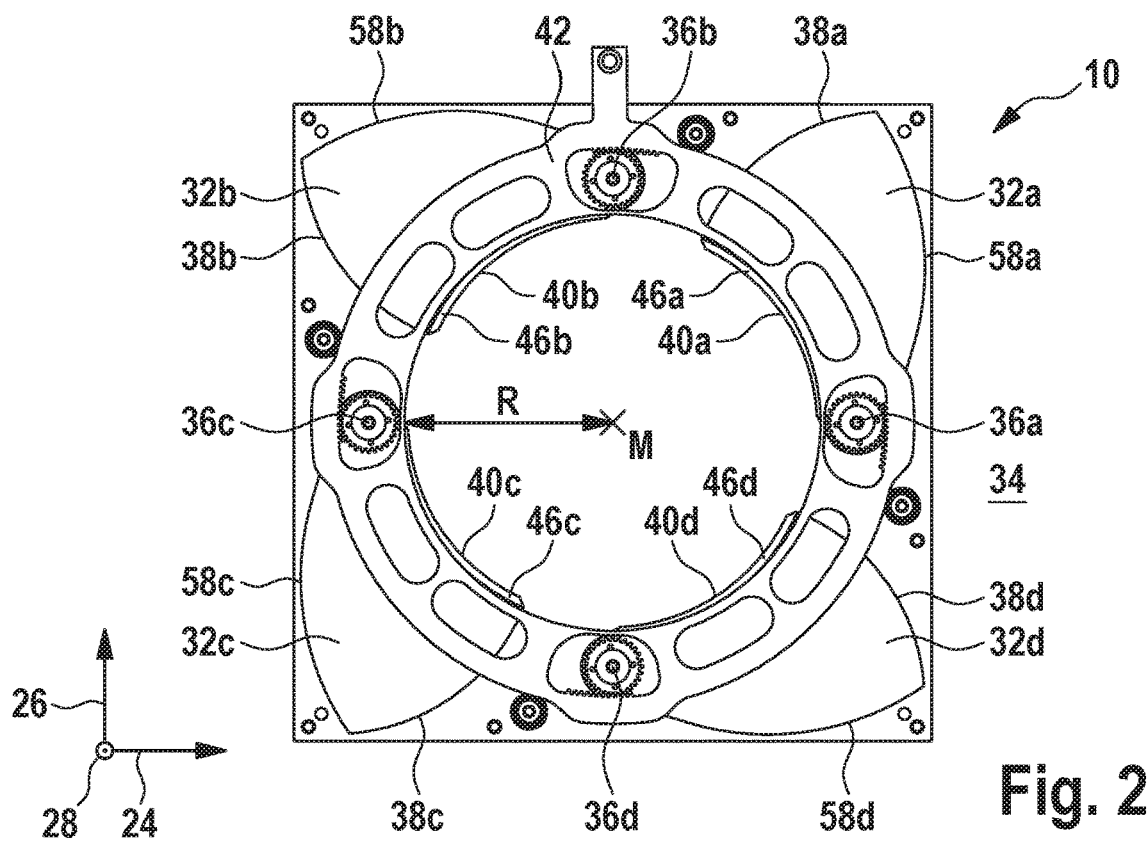
FIG. 2 a top view of the closing device as shown in FIG. 1 in the flow position.

FIG. 2 shows that the closing device 10 further comprises several closing elements 32a-32d with a substantially flat extension, which are arranged in a working plane 34 (here the drawing plane). The terms "closing element," "rotatable blade," "shutter," and variations thereof, may be used interchangeably herein and may refer to a non-porous three-dimensional mechanical part manufactured from metal, plastic, carbon fiber, textile, composite, and/or combinations thereof. These mechanical parts may be machined, molded, cast, or otherwise shaped with interlocking and contacting edges. In one embodiment, each closing element 32a-32d may be structured as planar member having a fan, a blade, and/or a fin shape. The planar member may comprise a first surface and a second surface disposed opposite the first surface. The planar member may comprise a convex edge that is arranged adjacent to a concave edge of the planar member. As described herein, the convex edge may be beveled at a first angle relative to the first surface and the concave edge may be beveled at a second angle that is complementary to the first angle. In some embodiments, the closing elements 32a-32d may be referred to herein as a plurality of rotatable blades. The working plane 34 extends in the width direction 24 and in the height direction 26. The closing elements 32a-32d are arranged between the first connecting side 14 and the second connecting side 18. Each of the closing elements 32a-32d can be pivoted in the working plane 34 about a pivot axis 36a-36d, which in this case each is perpendicular to the drawing plane and the working plane 34 respectively. The pivot axes 36a-36d are perpendicular to the substantially flat extension of the closing elements 32a-32d. In some embodiments, the pivot axes 36a-36d may be disposed in the center of a respective gear wheel fixedly attached to each of the closing elements 32a-32d. For instance, a first gear wheel may be pinned, adhered, welded, or otherwise attached to the first closing element 32a such that rotation of the first gear wheel (about the first pivot axis 36a) pivots the first closing element 32 about the first pivot axis 36a. The pivot axes 36a-36d may define a location of respective pins disposed in the base body 12. The pivot axes 36a-36d may be equally-spaced around a periphery of the gas passage 22 on a common diameter or circle. In some embodiments, the closing elements 32a-32d may rotate about the pivot axes 36a-36d on pins that are disposed in at least a portion of the base body 12. The gear wheel may be fixedly attached to the planar member extending from the first surface. In some embodiments, the gear wheels may comprise center axes that are coincident, or axially inline, with the pivot axes 36a-36d.

Figure 3:
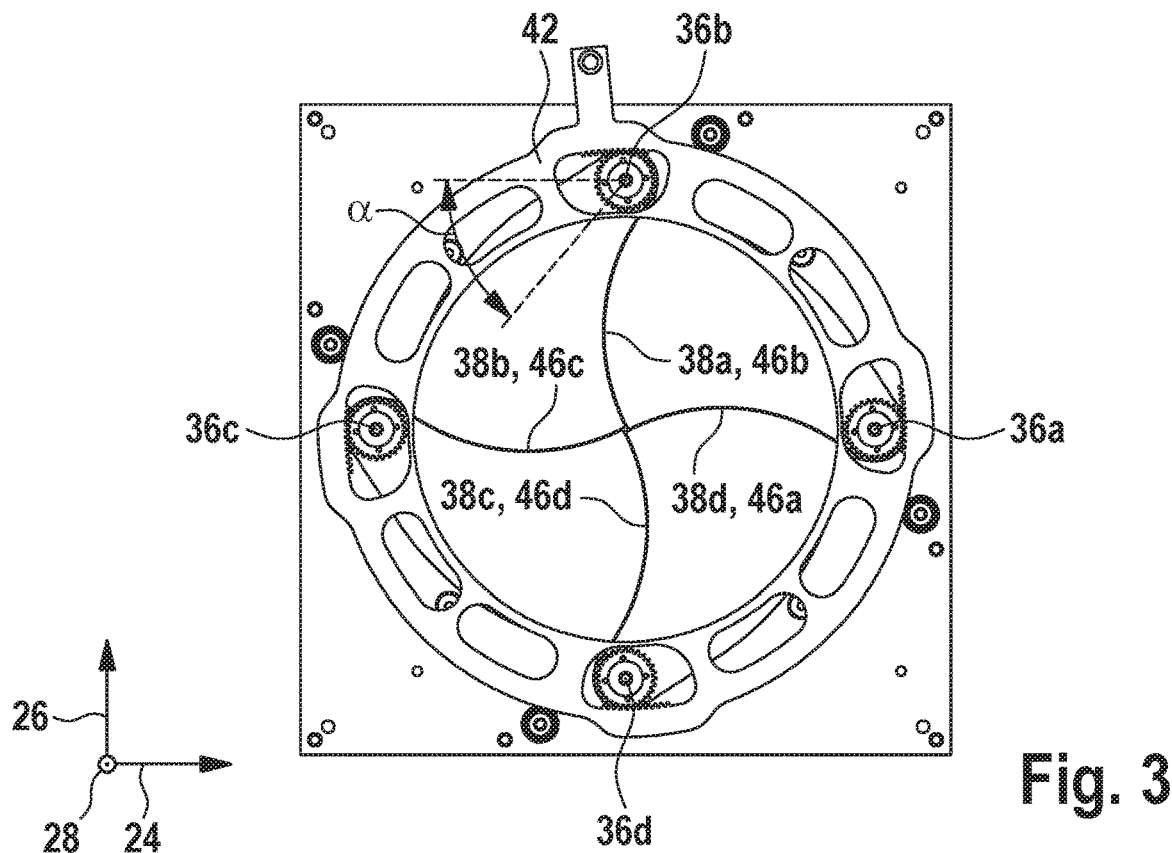
FIG. 3 a top view of the closing device as shown in FIG. 1 in the blocking position.

This arrangement allows the closing elements 32a-32d to block a flow of gas from the first opening 16 to the second opening 20 in a blocking position, see FIG. 3, and to allow a free flow of gas from the first opening 16 to the second opening 20 in a flow position, see FIG. 2. In one embodiment, the closing elements 32a-32d, when configured as a plurality of rotatable blades, or shutters, may be pivotally-mounted to the base body at respective pivot axes. The pivot axes may be disposed outside of the periphery of the gas passage 22, or aperture, and may also be disposed inside the outer frame. In this example, the plurality of rotatable blades may be rotatably movable between a conduit-open position and a conduit-blocking position. When in the conduit-open position, the plurality of rotatable blades are arranged having portions outside of the gas passage 22 (e.g., the aperture) and inside the outer frame defining a gas flow path running from the first connecting side to the second connecting side that is unobstructed. When in the conduit-blocking position the portions are arranged inside the gas passage 22 (e.g., aperture) interlocking with one another and obstructing the gas flow path.

As can be clearly seen in the comparison between FIGS. 2 and 3, each closing element 32a-32d has a first bounding side 38a-38d of its respective substantially flat extension and a second bounding side 40a-40d of its respective substantially flat extension, which are configured complementary to each other. This has the effect that each closing element 32a-32d in the blocking position has its first bounding side 38a-38d in the working plane 34 positively locking against the second bounding side 40a-40d of an adjacent closing element 32a-32d and has its second bounding side 40a-40d in the working plane 34 positively locking against the first bounding side 38a-38d of another adjacent closing element 32a-32d. As a result, see FIG. 3, the substantially flat extensions block the flow in the blocking position. In some embodiments, the portions that are arranged inside the aperture, as described above, interlocking with one another (e.g., in the conduit-blocking position) may include a concave edge of a first rotatable blade of the plurality of rotatable blades contacting a convex edge of a second rotatable blade of the plurality of rotatable blades, and so on. By way of example, when the closing device 10 comprises four rotatable blades, or closing elements 32a-32d, and is in the conduit-blocking position, the concave edge of a first rotatable blade of the plurality of rotatable blades contacts a convex edge of a radially adjacent second rotatable blade of the plurality of rotatable blades, a concave edge of the second rotatable blade contacts a convex edge of a radially adjacent third rotatable blade of the plurality of rotatable blades, a concave edge of the third rotatable blade contacts a convex edge of a radially adjacent fourth rotatable blade of the plurality of rotatable blades, and a concave edge of the fourth rotatable blade contacts a convex edge of the first rotatable blade. Each of the closing elements 32a-32d may be disposed in the same plane and may be configured to rotate in this plane. For instance, the first surface of each rotatable blade may be disposed in the same plane and as the rotatable blades are rotated in the same plane, the closing device 10 may be actuated between the conduit-open position and the conduit-blocking position, and vice versa.

Each of the closing elements 32a-32d also has a third bounding side 58a-58d of its substantially flat extension, which may rest against, or contact, frame 30, especially in the flow position. In some embodiments, the first bounding side 38a-38d may comprise a convex edge running from the second bounding side 40a-40d to the third bounding side 58a-58d. Additionally or alternatively, the second bounding side 40a-40d may have a concave edge. The diameter of the convex edge may be the same as the diameter of the concave edge.

The closing elements 32a-32d are in operative connection with a common actuating element 42, or actuation ring, so that the closing elements are in the flow position (e.g., conduit-open position, etc.) when the actuating element 42 is in an open position and in the blocking position (e.g., conduit-blocking position, etc.) when the actuating element 42 is in a closed position, see FIG. 3. The actuating element 42 can be operated from outside the base body 12. The terms "actuating element" or "actuation ring," and variations thereof, may be used interchangeably herein and may refer to a three-dimensional mechanical part manufactured from metal, plastic, carbon fiber, textile, composite, and/or combinations thereof. These mechanical parts may be stamped, machined, molded, cast, and/or otherwise formed. The mechanical parts may include gear teeth formed in a portion of the material making up the parts. In some embodiments, these gear teeth may engage with mating gear teeth of a gear wheel of the shutters.

In the embodiment shown here the base body 12 is cuboid. In addition, the first connecting side 14 and the second connecting side 18 are rectangular. This embodiment may be considered advantageous with regard to the ratio of the size of the connecting sides 14, 18 and the size of the openings 16, 20. It should be noted, however, that other shapes can also be realized without difficulty, such as a triangular, a pentagonal, or a hexagonal shape.

The frame 30 extends in sections in a longitudinal direction 28 and the width direction 24 and in the longitudinal direction 28 and the height direction 26. The first opening 16 and the second opening 20 are round, or circular, in this embodiment form. However, other shapes can also be selected for the openings 16, 20, such as an oval shape, a square, a pentagon, or a hexagon shape.

Figure 6:
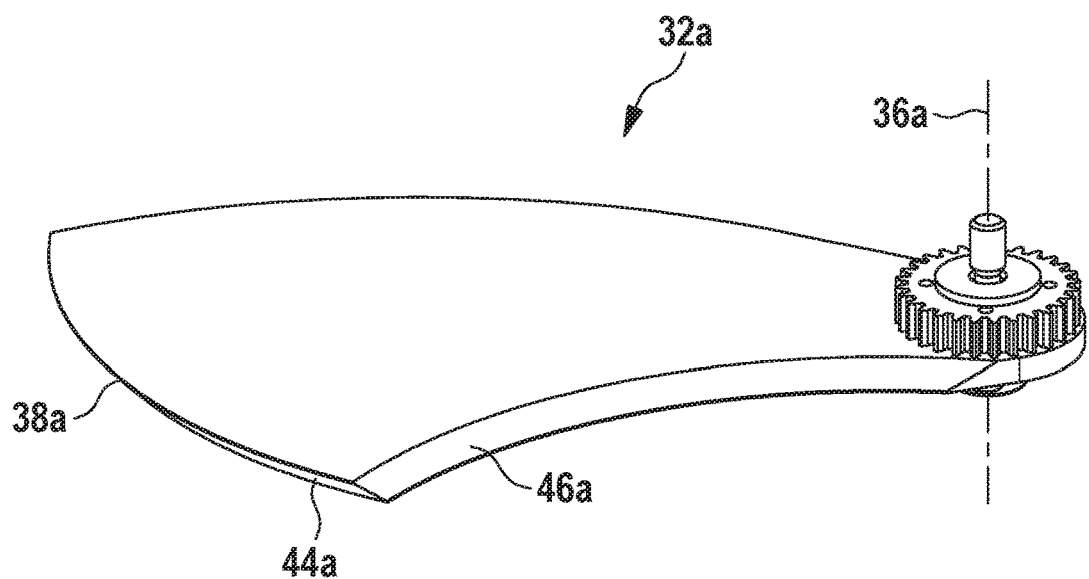
FIG. 6 a perspective view of one of the closing elements of FIG. 2.

The second bounding side 40a-40d is rounded, and a radius of the second bounding side 40a-40d corresponds to the radius R of the first opening 16. Since the first bounding side 38a-38d interacts with the second bounding side 40a-40d in a positive locking manner, the radius of the first bounding side 38a-38d therefore also corresponds to the radius R of the first opening 16. As the first opening 16 and the second opening 20 have the same configuration, the second opening 20 also has the radius R. The first bounding side 38a-38d, see FIG. 6 with a representation of the closing element 32a, has a first beveled edge 44a, and the second bounding side 40a-40d has a second beveled edge 46a, which are configured complementary to each other. This causes the first beveled edge 44a-44d and an adjacent second beveled edge 46a-46d to at least partially overlap in the blocking position when viewed along the longitudinal direction 28. When in the conduit-blocking position, the only overlap and contact between the closing elements 32a-32d (e.g., the plurality of rotatable blades, etc.) may occur at respective complementary beveled edges.

Figure 4:
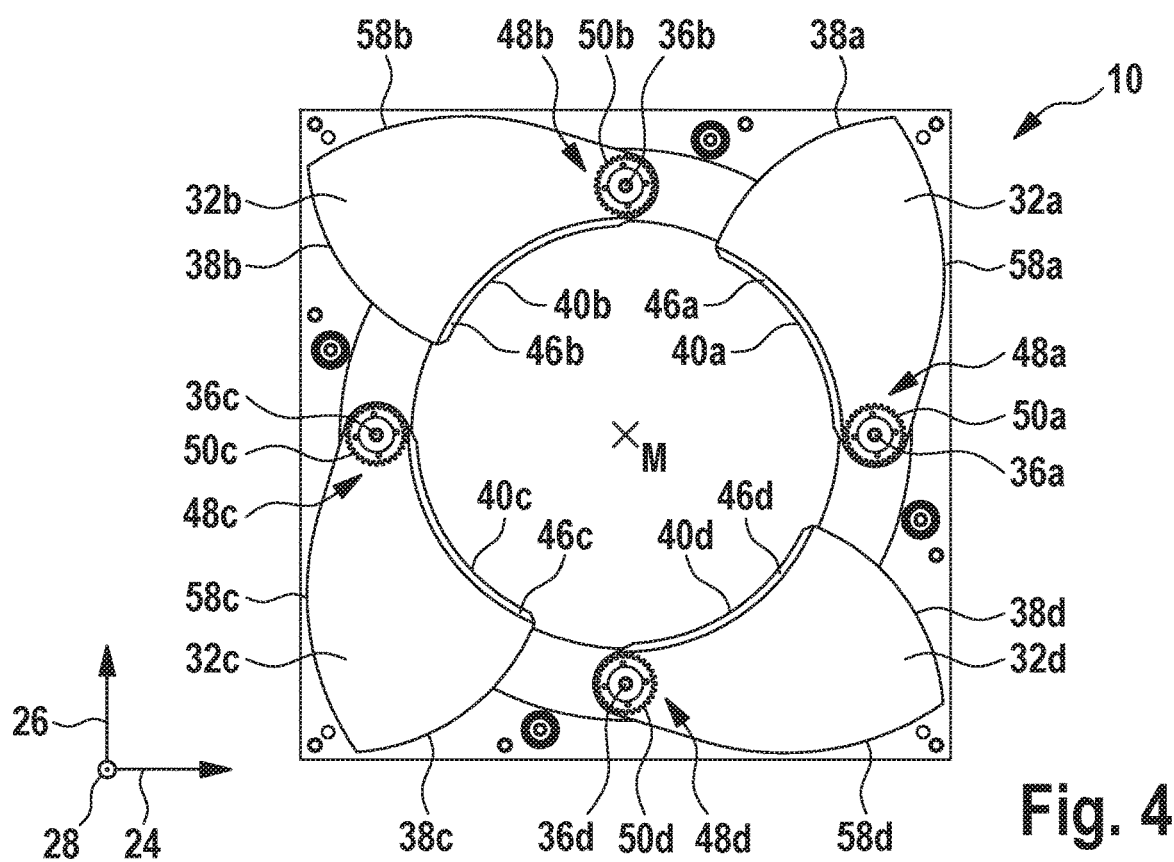
FIG. 4 the illustration in FIG. 2 without the actuating element.

As can be seen well from FIG. 4, the closing device 10 has a plurality of drive output elements 48a-48d, wherein an output element 48a-48d of the drive output elements 48a-48d is non-rotatably, or fixedly, arranged on each closing element 32a-32d, which is in operative connection with the actuating element 42. The terms "drive output element," "gear," "toothed wheel," "gear wheel," and variations thereof, may be used interchangeably herein. The drive output element may refer to a three-dimensional mechanical part manufactured from metal, plastic, carbon fiber, textile, composite, and/or combinations thereof. These mechanical parts may be machined, molded, cast, or otherwise formed with a plurality of teeth dispose along an inner or outer surface of the part. In some embodiments, the drive output elements 48a-48d may be pinned, fastened, welded, or otherwise fixed to the closing elements 32a-32d. Additionally or alternatively, the drive output elements 48a-48d may be welded on, glued on, pressed onto, machined from, or formed on the closing elements 32a-32d. As a result, when the actuating element 42 is rotatably displaced, in particular about the center point M of the closing device 10, a torque is exerted on the drive output element 48a-48d which pivots the closing element 32a-32d about the pivot axis 36a-36d.

Figure 5:
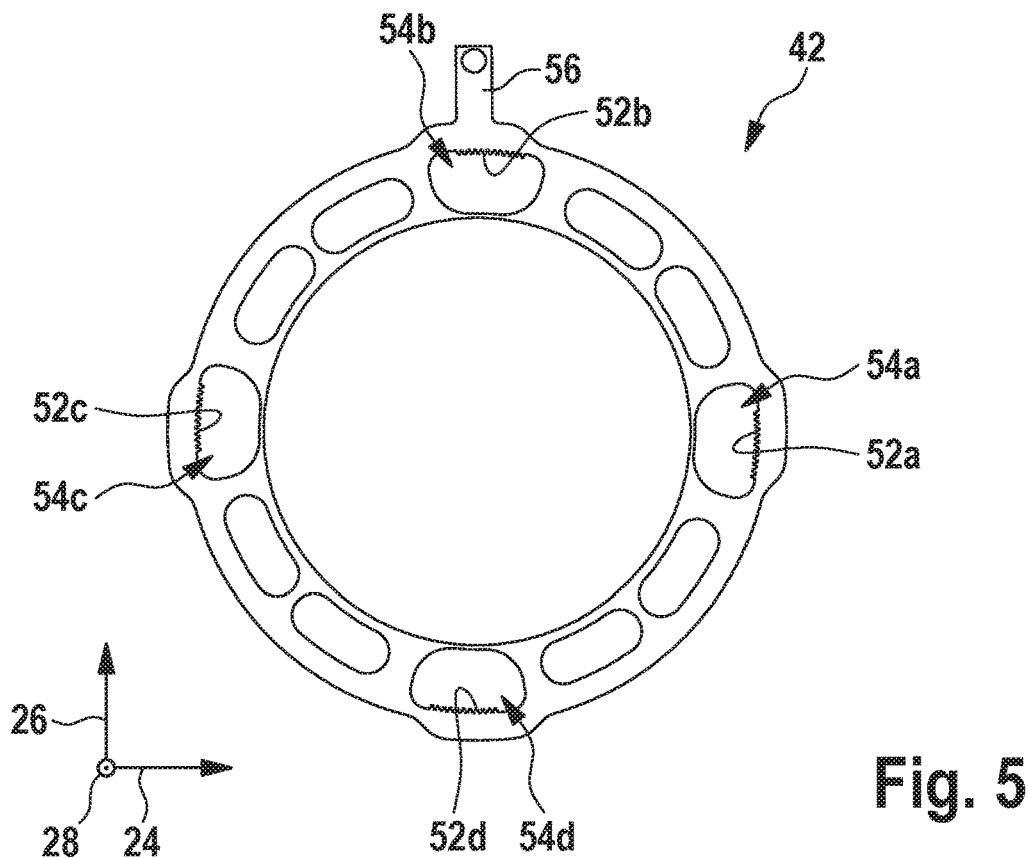
FIG. 5 a top view of the actuating element of FIG. 2.

In the embodiment shown here, each of the drive output elements 48a-48d has a gear 50a-50d which engages with a toothed rail 52a-52d arranged on the actuating element 42, see FIG. 5.

As can be clearly seen in FIG. 5, the actuating element 42 is configured as a ring with several recesses 54a-54d, wherein the drive output elements 48a-48d engage in the recesses 54a-54d. In addition, a lever 56, or lever arm, of the actuating element can be seen, which is guided outwards through the jacket of the base body 12 in a slot 58. In some embodiments, the toothed rails 52a-52d may be formed as the teeth of an internal ring gear. As described above, the actuating element 42 may be referred to as an actuation ring. The actuation ring 42 may be disposed between the first connecting side 14 and the second connecting side 18 of the base body 12, as shown in FIGS. 1-3. The actuation ring 42 may comprise an inner peripheral surface that has a dimension that is at least a size of the periphery of the aperture, or gas passage 22. The actuation ring 42 may be rotatable about a center of the aperture (e.g., the center point, M, of the closing device 10, etc.) and may comprise a plurality of gear teeth. This plurality of gear teeth may physically engage (e.g., intermesh, etc.) with each gear wheel of the plurality of rotatable blades (e.g., the closing elements 32a-32d). The actuation ring 42 may comprise a lever arm 56 that extends from inside the base body 12 to an area outside of the outer frame of the base body 12, as shown in FIGS. 1-3. In some embodiments, movement of the lever arm 56 from the area outside of the outer frame rotates the actuation ring 42 about the center of the aperture, or gas passage 22, and moves the plurality of teeth relative to each gear wheel of the plurality of rotatable blades moving the plurality of rotatable blades inside the outer frame between the conduit-open position and the conduit-blocking position.

A maximum pivot angle α of the closing elements 32a-32d between the flow position and the blocking position is less than 60° here, see FIG. 3.

What is claimed is:

1. A closing device configured for a gas-conducting conduit, wherein the closing device comprises a base body extending between a first connecting side with a first opening and a second connecting side with a second opening, wherein the connecting sides each extend in a width direction and a height direction and are spaced apart from one another by a circumferential frame which forms a jacket of the base body, the closing device further comprising a plurality of closing elements with a substantially flat extension, which are arranged in a working plane extending in the width direction and the height direction and are arranged between the first connecting side and the second connecting side, each of the closing elements being arranged about a pivot axis which is perpendicular to the substantially flat extension, and being pivotable in the working plane so that the closing elements block a flow of gas from the first opening to the second opening in a blocking position and allow a free flow of gas from the first opening to the second opening in a flow position, wherein each closing element has a first bounding side of its substantially flat extension and a second bounding side of its substantially flat extension which are configured complementary to each other, so that each closing element in the blocking position has its first bounding side in the working plane positively locking to a second bounding side of an adjacent closing element and its second bounding side in the working plane positively locking to a first bounding side of a further adjacent closing element, so that the substantially flat extensions block the flow, wherein the first bounding side has a first beveled edge and the second bounding side has a second beveled edge which are configured complementary to one another, and the first beveled edge at least partially overlaps an adjacent second beveled edge in the locking position when viewed along the longitudinal direction, and the second beveled edge at least partially underlaps an adjacent first beveled edge in the locking position when viewed along the longitudinal direction, wherein the closing elements are in operative connection with a common actuating element, so that the closing elements are in the flow position in an open position of the actuating element and are in the blocking position in a closed position of the actuating element, wherein the actuating element can be actuated from outside the base body, and wherein each closing element further includes a third bounding side of its substantially flat extension, a portion of the third bounding side abutting the frame in the flow position.

2. The closing device of claim 1, wherein the base body is cuboidal.

3. The closing device of claim 1, wherein one of the first connecting side or the second connecting side is rectangular.

4. The closing device of claim 1, wherein the frame extends in sections in a longitudinal direction and the width direction and in the longitudinal direction and the height direction.

5. The closing device of claim 1, wherein one of the first opening or the second opening is round.

6. The closing device of claim 1, wherein the second bounding side is rounded and a radius of the second bounding side corresponds to the radius of the first opening.

7. The closing device of claim 1, comprising a plurality of drive output elements, wherein a drive output element of the plurality of drive output elements is arranged in a rotationally fixed manner on each closing element, which is in operative connection with the actuating element, so that when the actuating element is displaced, a torque is exerted on the drive output element which pivots the closing element about the pivot axis.

8. The closing device of claim 7, wherein each of the drive output elements has a gear which engages with a toothed rail arranged on the actuating element.

9. The closing device of claim 7, wherein the actuating element is configured as a ring having a plurality of recesses, wherein the drive output elements engage in the recesses.

10. The closing device of claim 1, wherein the actuating element has a lever which is guided outwards through the jacket of the base body in a slot.

11. The closing device of claim 1, wherein a maximum pivot angle of the closing elements between the flow position and the blocking position is less than 90°.

12. The closing device of claim 1, wherein a maximum pivot angle of the closing elements between the flow position and the blocking position is less than 60°.

13. The closing device of claim 1, wherein a number of the closing elements is at least 3.

14. The closing device of claim 1, wherein a number of the closing elements is 4.

15. The closing device of claim 1, wherein a number of the closing elements is at most 6.

16. The closing device of claim 1, wherein a number of the closing elements is 4.

17. A closing device for a gas-conducting conduit, wherein the closing device comprises a base body extending between a first connecting side with a first opening and a second connecting side with a second opening, wherein the connecting sides are spaced apart from one another, the closing device further comprising a plurality of closing elements, which are arranged in a working plane between the first connecting side and the second connecting side, each of the closing elements being arranged about a pivot axis and being pivotable in the working plane, wherein each closing element has a first bounding side and a second bounding side which are configured complementary to each other, so that each closing element in a first position has its first bounding side in the working plane positively locking to a second bounding side of an adjacent closing element and its second bounding side in the working plane positively locking to a first bounding side of a further adjacent closing element, wherein the first bounding side has a first beveled edge and the second bounding side has a second beveled edge which are configured complementary to one another, and the first beveled edge at least partially overlaps an adjacent second beveled edge in the first position when viewed along the longitudinal direction, and the second beveled edge at least partially underlaps an adjacent first beveled edge in the locking position when viewed along the longitudinal direction, wherein the closing elements are in operative connection with a common actuating element that can be actuated from outside the base body, and wherein each closing element further includes a third bounding side of its substantially flat extension, a portion of the third bounding side abutting the frame in the flow position.

18. A low-profile gas conduit flow closure device, comprising:
a base body having a first side and a second side separated by a thickness, the first side and the second side each planarly extending a height and a width defining an outer frame at extents of the height and the width;
an aperture passing through the base body from the first side to the second side, the aperture having a periphery defined inside the outer frame; and
a plurality of rotatable blades disposed between the first side and the second side of the base body; the plurality of rotatable blades pivotally-mounted to the base body at respective pivot axes that are disposed outside of the periphery of the aperture and disposed inside the outer frame, the plurality of rotatable blades rotatably movable between a conduit-open position and a conduit-blocking position, wherein in the conduit-open position the plurality of rotatable blades are arranged having portions outside of the aperture and inside the outer frame defining a gas flow path running from the first side to the second side that is unobstructed, and wherein in the conduit-blocking position the portions are arranged inside the aperture interlocking in a partially overlapping configuration with one another and obstructing the gas flow path, wherein each rotatable blade of the plurality of rotatable blades, comprises:
a planar member comprising a first surface and a second surface disposed opposite the first surface, the planar member comprising a convex edge arranged adjacent to a concave edge of the planar member, the convex edge beveled at a first angle relative to the first surface and configured to overlap an adjacent concave edge of another rotatable blade in a flow position, the concave edge beveled to a second angle that is complementary to the first angle and configured to underlap an adjacent convex edge of the another rotatable blade in the flow position; and a gear wheel fixedly attached to the planar member and extending from the first surface, the gear wheel having a center axis.

19. The low-profile gas conduit flow closure device of claim 18, further comprising:

an actuation ring disposed between the first side and the second side of the base body, wherein the actuation ring comprises an inner peripheral surface that has a dimension that is at least a size of the periphery, wherein the actuation ring is rotatable about a center of the aperture and comprises a plurality of gear teeth that physically engage with each gear wheel of the plurality of rotatable blades, wherein the actuation ring comprises a lever arm that extends from inside the base body to an area outside of the outer frame, and wherein movement of the lever arm from the area outside of the outer frame rotates the actuation ring about the center of the aperture and moves the plurality of teeth relative to each gear wheel of the plurality of rotatable blades moving the plurality of rotatable blades inside the outer frame between the conduit-open position and the conduit-blocking position, wherein the portions that are arranged inside the aperture interlocking with one another in the conduit-blocking position include a concave edge of a first rotatable blade of the plurality of rotatable blades contacting a convex edge of a second rotatable blade of the plurality of rotatable blades.

* * * * *